United States Patent
Zhang et al.

(10) Patent No.: US 10,510,014 B2
(45) Date of Patent: Dec. 17, 2019

(54) ESCALATION-COMPATIBLE PROCESSING FLOWS FOR ANTI-ABUSE INFRASTRUCTURES

(71) Applicant: LinkedIn Corporation, Sunnyvale, CA (US)

(72) Inventors: Jie Zhang, Sunnyvale, CA (US); Tzu-Han Jan, Sunnyvale, CA (US); Xi Sun, Sunnyvale, CA (US); Grace W. Tang, Los Altos, CA (US); Sahil Handa, Sunnyvale, CA (US); Vladimir I. Shlosberg, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 247 days.

(21) Appl. No.: 15/609,275

(22) Filed: May 31, 2017

(65) Prior Publication Data
US 2018/0349606 A1    Dec. 6, 2018

(51) Int. Cl.
| | |
|---|---|
| *G06F 21/55* | (2013.01) |
| *G06N 7/00* | (2006.01) |
| *G06F 21/57* | (2013.01) |
| *G06N 20/00* | (2019.01) |

(52) U.S. Cl.
CPC .......... *G06N 7/005* (2013.01); *G06F 21/552* (2013.01); *G06F 21/577* (2013.01); *G06N 20/00* (2019.01); *G06F 2221/034* (2013.01)

(58) Field of Classification Search
CPC ........ G06F 21/552; G06F 21/50; G06F 21/55; G06F 21/554; G06F 21/56; G06F 21/566; H04L 63/102; H04L 63/14; H04L 63/1408; H04L 63/1416; H04L 63/1441; H04L 63/20
See application file for complete search history.

(56) References Cited

U.S. PATENT DOCUMENTS

| | | | |
|---|---|---|---|
| 2006/0041539 A1* | 2/2006 | Matchett | G06Q 10/0639 |
| 2006/0206615 A1* | 9/2006 | Zheng | H04L 63/0227 709/229 |
| 2006/0242690 A1* | 10/2006 | Wolf | H04L 41/0213 726/6 |
| 2007/0150934 A1* | 6/2007 | Fiszman | H04L 63/102 726/1 |
| 2007/0198908 A1* | 8/2007 | Kirkpatrick | G06F 11/3664 715/205 |
| 2009/0187968 A1* | 7/2009 | Roese | H04L 41/0893 726/1 |
| 2009/0276824 A1* | 11/2009 | Rafiq | G06F 21/604 726/1 |
| 2012/0203588 A1* | 8/2012 | Burri | G06Q 10/06311 705/7.14 |

(Continued)

*Primary Examiner* — Eric W Shepperd
(74) *Attorney, Agent, or Firm* — Park, Vaughan, Fleming & Dowler LLP; Chia-Hsin Suen

(57) ABSTRACT

The disclosed embodiments provide a system for processing user actions with a service. During operation, the system uses a statistical model to obtain a first metric associated with a user action received by a service. Next, the system applies a set of static decisions to the metric and one or more attributes of the user action to determine a first response to the user action. The system then uses a set of dynamic rules to produce a first modification to the first response. Finally, the system generates output for applying the first response to the user action.

20 Claims, 4 Drawing Sheets

(56) References Cited

U.S. PATENT DOCUMENTS

| | | | |
|---|---|---|---|
| 2013/0060933 A1* | 3/2013 | Tung | G06F 11/3495 |
| | | | 709/224 |
| 2014/0068030 A1* | 3/2014 | Chambers | H04L 41/0809 |
| | | | 709/220 |
| 2015/0339477 A1* | 11/2015 | Abrams | G06F 21/554 |
| | | | 726/23 |
| 2017/0041344 A1* | 2/2017 | Nandakumar | H04L 63/20 |
| 2017/0098219 A1* | 4/2017 | Peram | G06Q 30/0225 |
| 2018/0084012 A1* | 3/2018 | Joseph | H04L 63/1416 |
| 2018/0287902 A1* | 10/2018 | Chitalia | H04L 43/045 |
| 2018/0288063 A1* | 10/2018 | Koottayi | G06F 21/552 |
| 2018/0375891 A1* | 12/2018 | Juncker | G06F 8/65 |

\* cited by examiner

ESCALATION-COMPATIBLE PROCESSING FLOWS FOR ANTI-ABUSE INFRASTRUCTURES

BACKGROUND

Field

The disclosed embodiments relate to anti-abuse infrastructures. More specifically, the disclosed embodiments relate to escalation-compatible processing flows for anti-abuse infrastructures.

Related Art

Incident response techniques are commonly used to address and manage attacks such as security breaches, fake user accounts, spamming, phishing, account takeovers, scraping, and/or other types of malicious or undesired user activity. For example, an organization may use an incident response team and/or incident response system to identify, respond to, escalate, contain, and/or recover from security incidents. The organization may also analyze past incidents to obtain insights related to responding to and/or preventing similar types of activity in the future. Consequently, the negative impact of security incidents may be reduced by quickly and effectively detecting, adapting to, and responding to malicious activity within Information Technology (IT) infrastructures.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
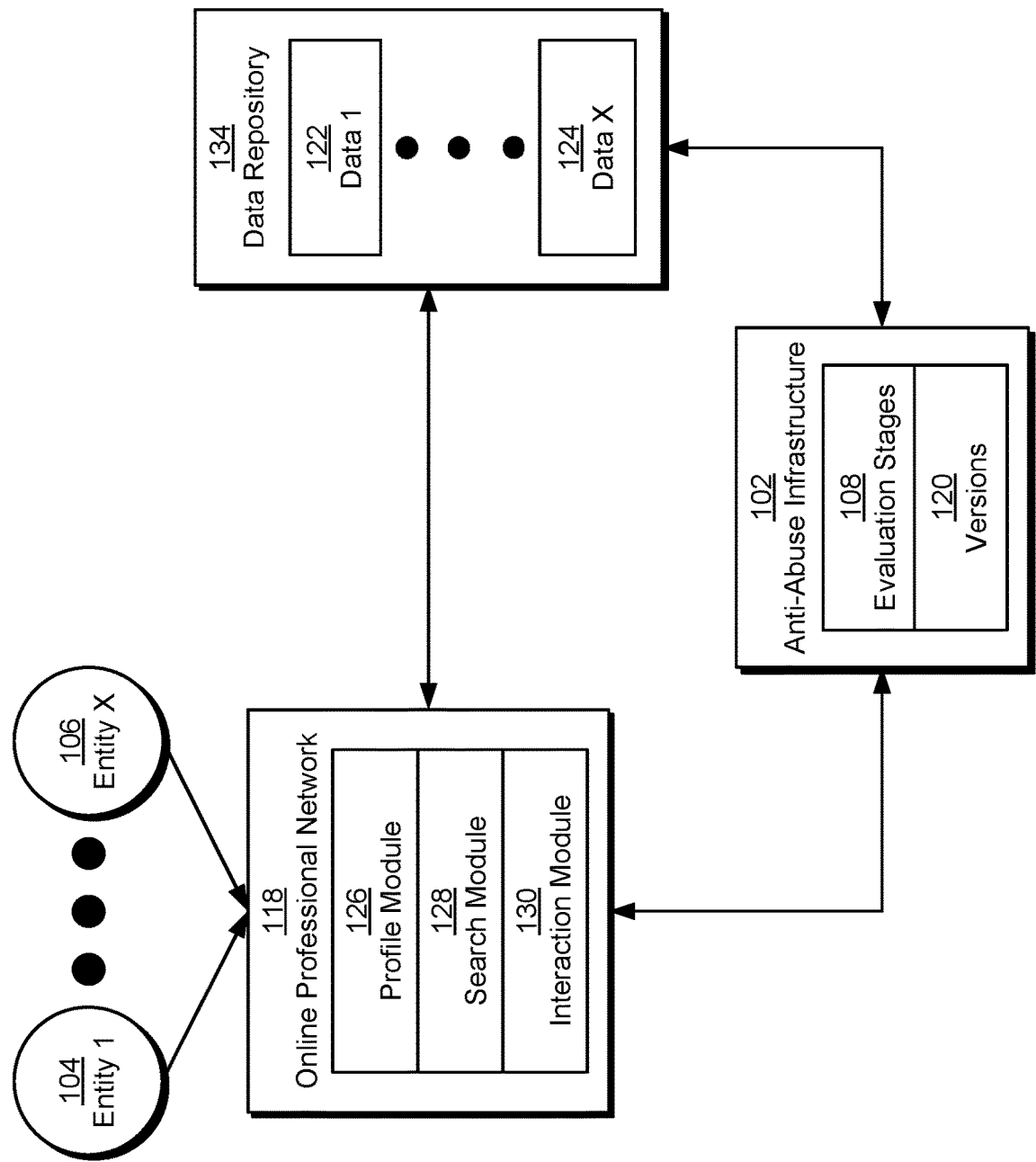
FIG. 1 shows a schematic of a system in accordance with the disclosed embodiments.

The disclosed embodiments provide a method, apparatus, and system for managing malicious user activity with a service. As shown in FIG. 1, the service may be provided by or associated with an online professional network 118 or other community of users, which is used by a set of entities (e.g., entity 1 104, entity x 106) to interact with one another in a professional, business and/or social context.

The entities may include users that use online professional network 118 to establish and maintain professional connections, list work and community experience, endorse and/or recommend one another, search and apply for jobs, and/or perform other actions. The entities may also include companies, employers, and/or recruiters that use the online professional network to list jobs, search for potential candidates, provide business-related updates to users, advertise, and/or take other action. The entities may further include guests that are not registered members of the online professional network and thus have restricted access to the online professional network.

Entities that are registered members of online professional network 118 may use a profile module 126 in the online professional network to create and edit profiles containing information related to the entities' professional and/or industry backgrounds, experiences, summaries, projects, skills, and so on. The profile module may also allow the entities to view the profiles of other entities in the online professional network.

Entities that are registered members and guests may use a search module 128 to search online professional network 118 for people, companies, jobs, and/or other job- or business-related information. For example, the entities may input one or more keywords into a search bar to find profiles, job postings, articles, advertisements, and/or other information that includes and/or otherwise matches the keyword(s). The entities may additionally use an "Advanced Search" feature of the online professional network to search for profiles, jobs, and/or other information by categories such as first name, last name, title, company, school, location, interests, relationship, industry, groups, salary, experience level, etc.

Entities that are registered members of online professional network 118 may also use an interaction module 130 to interact with other entities in the online professional network. For example, the interaction module may allow an entity to add other entities as connections, follow other entities, send and receive messages with other entities, join groups, and/or interact with (e.g., create, share, re-share, like, and/or comment on) posts from other entities. The interaction module may also allow the entity to upload and/or link an address book or contact list to facilitate connections, follows, messaging, and/or other types of interactions with the entity's external contacts.

Those skilled in the art will appreciate that online professional network 118 may include other components and/or modules. For example, the online professional network may include a homepage, landing page, and/or content feed that provides the latest postings, articles, and/or updates from the entities' connections and/or groups to the entities. Similarly, the online professional network may include features or mechanisms for recommending connections, job postings, articles, and/or groups to the entities.

In one or more embodiments, data (e.g., data 1 122, data x 124) related to the entities' profiles and activities on online professional network 118 is aggregated into a data repository 134 for subsequent retrieval and use. For example, each profile update, profile view, connection, follow, post, comment, like, share, search, click, message, interaction with a group, and/or other action performed by an entity in the online professional network may be logged and stored in a database, data warehouse, cloud storage, and/or other data-storage mechanism providing data repository 134.

In turn, the data may be analyzed by an anti-abuse infrastructure 102 in a real-time, nearline, and/or offline basis to detect and respond to attacks such as security breaches, fake user accounts, account takeovers, spamming, phishing, scraping, and/or other types of malicious or undesired user activity with online professional network 118. As described in further detail below with respect to FIG. 2, anti-abuse infrastructure 102 may use multiple evaluation stages 108 and/or multiple versions 120 of evaluation stages 108 to assess, respond to, and escalate security incidents associated with user activity with online professional network 118. In turn, evaluation stages 108 and/or versions 120 may improve the accuracy and speed with which the security incidents are identified and handled.

Figure 2:
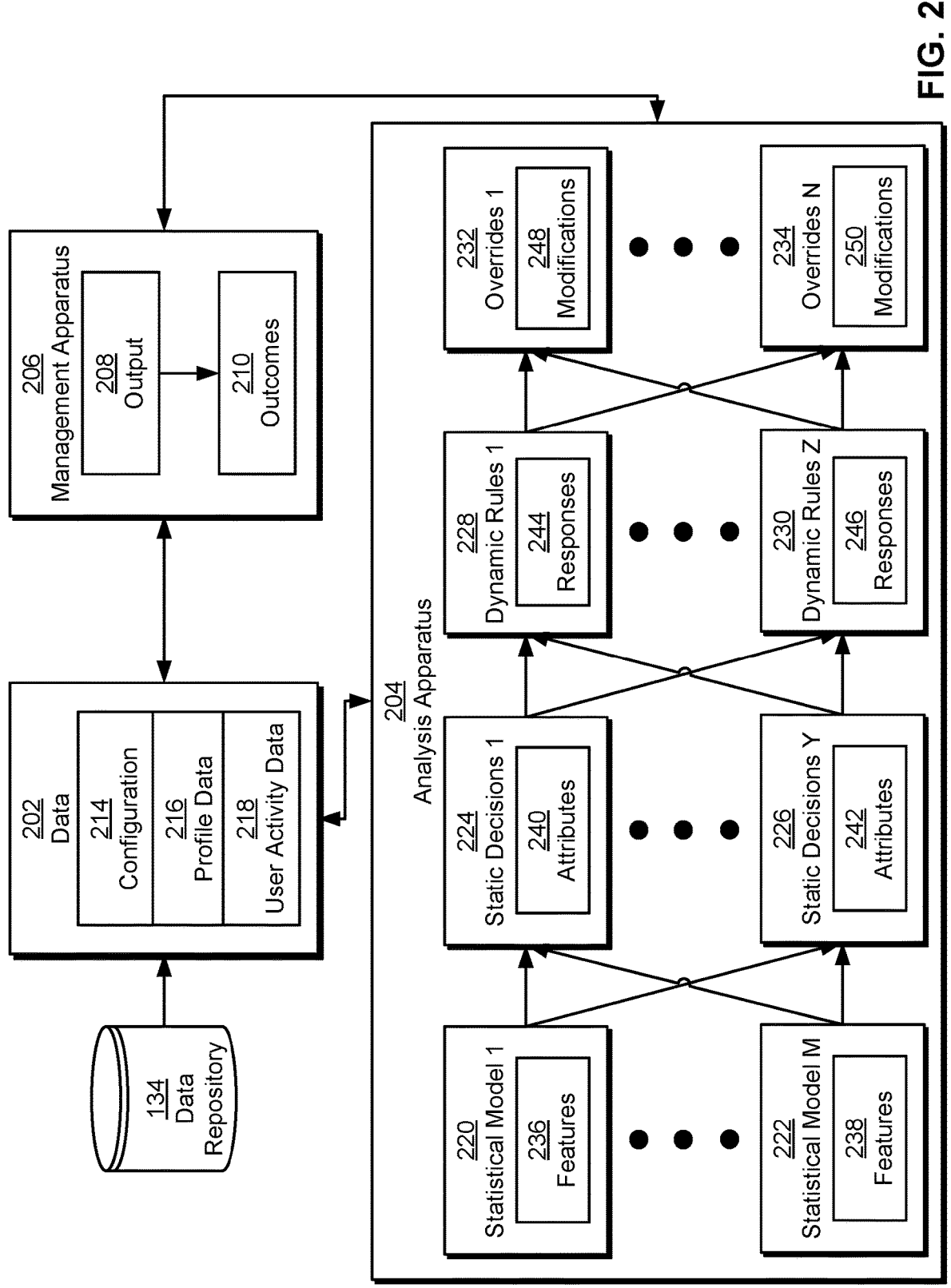
FIG. 2 shows a system for processing user actions with a service in accordance with the disclosed embodiments.

FIG. 2 shows a system for processing user actions with a service, such as anti-abuse infrastructure 102 of FIG. 1, in accordance with the disclosed embodiments. The system includes an analysis apparatus 204 and a management apparatus 206, which interact with one another and use data repository 134 to manage security incidents with the service. For example, the system of FIG. 2 may be used to detect and respond to malicious activity involving an online professional network, such as online professional network 118 of FIG. 1. The system may also, or instead, be used to process user actions with other network-based services, such as other types of social networks, online storage systems, e-commerce platforms, web applications, email services, messaging services, financial transaction services, and/or streaming media services.

As mentioned above, data repository 134 and/or another primary data store may be queried for data 202 that includes profile data 216 for members of a social network (e.g., online professional network 118 of FIG. 1), as well as user activity data 218 that logs the activity of the members and/or guests within and/or outside the social network. Profile data 216 may include data associated with member profiles in the social network. For example, profile data 216 for an online professional network may include a set of attributes for each user, such as demographic (e.g., gender, age range, nationality, location, language), professional (e.g., job title, professional summary, employer, industry, experience, skills, seniority level, professional endorsements), social (e.g., organizations of which the user is a member, geographic area of residence), and/or educational (e.g., degree, university attended, certifications, publications) attributes. Profile data 216 may also include a set of groups to which the user belongs, the user's contacts and/or connections, and/or other data related to the user's interaction with the social network.

Attributes of the members may be matched to a number of member segments, with each member segment containing a group of members that share one or more common attributes. For example, member segments in the social network may be defined to include members with the same industry, location, profession, skills, and/or language.

Connection information in profile data 216 may additionally be combined into a graph, with nodes in the graph representing entities (e.g., users, schools, companies, locations, etc.) in the social network. In turn, edges between the nodes in the graph may represent relationships between the corresponding entities, such as connections between pairs of members, education of members at schools, employment of members at companies, following of a member or company by another member, business relationships and/or partnerships between organizations, and/or residence of members at locations.

Profile data 216 may also, or instead, include user data for user accounts with other types of network-based services. For example, profile data 216 may include a name, email address, physical address, username, date of birth, gender, and/or other basic demographic information for a user of an e-commerce site.

User activity data 218 may include records of user interactions with the service. For example, the user activity data may identify impressions, clicks, likes, dislikes, shares, hides, comments, posts, updates, conversions, and/or other user interaction with content in a social network. The user activity data may also identify other types of activity, including login attempts, account creation activity, address book imports, connection requests and confirmations, password resets, messages, purchases, job-related activity (e.g., job postings, job searches, job applications, etc.), advertisement-related activity (e.g., creating advertisements, posting advertisements, clicking on advertisements, etc.), and/or interaction with groups or events Like profile data 216, user activity data 218 may be used to create a graph, with nodes in the graph representing social network members and/or content and edges between pairs of nodes indicating actions taken by members, such as creating or sharing articles or posts, sending messages, connection requests, joining groups, and/or following other entities.

Analysis apparatus 204 may obtain records of user actions with a given service as user activity data 218 from data repository 134. Analysis apparatus 204 may also, or instead, receive events representing the records from real-time and/or nearline sources of user activity data, such as an event stream and/or a monitoring component that executes within the service.

Each record may identify the type of user action being performed. For example, the record may identify the user action as a login attempt, account registration, address book upload, password reset, purchase, connection request, messaging, social network interaction (e.g., click, like, dislike, share, hide, comment, post, etc.), and/or other type of user activity monitored by the system.

The record may also be used to retrieve attributes 240-242 associated with the user action. For example, the attributes may be included in the record and/or in separate records that are linked to the record (e.g., using an identifier for the record). The attributes may include profile data 216, such as a name, email address, phone number, location, member identifier, profile completeness, and/or profile fields for the user associated with the user action. The attributes may also, or instead, include user input such as messages, search parameters, posts, user preferences, and/or other content submitted by the user with the user action. The attributes may further specify a context, such as an Internet Protocol (IP) address, user agent, and/or autonomous system from which the user action was received; the time needed to complete the user action (e.g., complete a registration form and/or write a message); the time at which the user action was received; and/or a state (e.g., IP address reputation, password validity, etc.) associated with the user action.

Next, analysis apparatus 204 may process the records and associated data to classify, respond to, and/or escalate security incidents and/or malicious activity represented by the corresponding user actions. Such processing may include an escalation-compatible processing flow that is performed in multiple evaluation stages (e.g., evaluation stages 108 of FIG. 1).

In the first evaluation stage, analysis apparatus 204 may apply statistical models (e.g., statistical model 1 220, statistical model m 222) to features 236-238 associated with the user actions to obtain a score, category, and/or other representation of risk of malicious activity in the user actions. Each statistical model may be adapted to a particular type of user action, a location associated with the user action, and/or a type of attack (e.g., spamming, phishing, scraping, fake user account creation, account takeover, etc.). Analysis apparatus 204 may use a configuration 214 from data repository 134 and/or another data store to match a given user action to one or more statistical models for analyzing the user action. For example, analysis apparatus 204 may match the country from which an account creation request was received to a set of statistical models. Each statistical model may assess a different type of risk associated with the account creation request. For example, a different statistical model may be used to determine the risk of fake account creation, spamming, phishing, and/or scraping represented by the account creation request.

Next, analysis apparatus 204 may obtain the selected statistical model(s) from data repository 134 and/or another data store and apply the statistical model(s) to the corresponding features 236-238. Features 236-238 may include attributes 240-242 associated with the user actions, along with other types of data related to security incidents. For example, features 236-238 may include contact information, network-related addresses and identities, timestamps and/or durations, and/or other attributes 240-242 for a given user action. Features 236-238 may also include metrics and/or dimensions related to other user actions, such as the total number of malicious or non-malicious user actions of the same type over a pre-specified period (e.g., the last 12 or 24 hours) and/or the total number of valid or invalid account registrations over the same period.

Features 236-238 may also include derived features that are generated from the attributes and/or other derived features. For example, the attributes may be aggregated, scaled, combined, bucketized, and/or otherwise transformed to produce derived features, which in turn may be further combined or transformed with one another and/or the primary features to generate additional derived features. The derived features may thus include boolean values indicating whether the first and last names associated with a registration request match, the similarity of the first and/or last name to the email address, and/or if the time to complete a form or message exceeds or falls below a threshold. The derived features may also include metrics such as ratios between valid and invalid user actions and/or reputation scores associated with IP addresses or cookies.

After scores and/or other types of output are generated from the statistical models, analysis apparatus 204 may advance to a second evaluation stage that applies one or more sets of static decisions (e.g., static decisions 1 224, static decisions y 226) to the output and additional attributes 240-242 of the user actions. The static decisions may include "hardcoded" or stable rules for generating standard responses 244-246 to the user actions. For example, the static decisions may include product decisions, "special case" rules, and/or policy-based rules. Like the statistical models, the static decisions may be matched to the user actions based on configuration 214 and/or attributes 240-242 of the user actions.

The static decisions may be represented as conditional statements, with each conditional statement specifying a condition and a result to be effected when the condition is met. For example, a static decision may include a condition that requires a score outputted by a statistical model to be higher than a threshold and a result of presenting a specific type of challenge (e.g., captcha challenge, two-factor verification, etc.) in response to a user action that meets the condition. In another example, a static decision may identify a condition as an IP address with a reputation for abuse and a result of blocking a user action that meets the condition and/or presenting a stricter challenge in response to the user action.

In a third evaluation stage, analysis apparatus 204 may use one or more sets of dynamic rules (e.g., dynamic rules 1 228, dynamic rules z 230) to generate modifications 248-250 to responses 244-246. Unlike the static decisions, the dynamic rules may be modified on a real-time or near-real-time basis. As a result, the dynamic rules may be quickly deployed to adapt to outages or other site or service issues, contain severe incidents, and/or implement security responses to escalations. After a dynamic rule is deemed to be stable and/or effective, the dynamic rule may be moved to a corresponding set of static decisions in the second evaluation stage and/or another stable set of rules in another evaluation stage.

Like the static decisions, the dynamic rules may be matched to the user actions using configuration 214 and/or attributes 240-242, and may include conditional statements. For example, a dynamic rule may have a condition that specifies values and/or regular expressions for the first name and last name in attributes 240-242 associated with an account creation request. If the condition is met (i.e., if the first and last names match the corresponding values or regular expressions), the dynamic rule may specify responding to the account creation request with the most stringent challenge and/or denying the account creation request. As a result, the dynamic rule may be used to contain or block malicious activity that is linked to the values and/or regular expressions for the first and last names. In another example, a dynamic rule may have a condition that specifies a captcha challenge in a response to a user action and a result of removing the captcha challenge from the response and/or switching to a different type of challenge. The dynamic rule may thus be used to temporarily turn off the captcha challenge in the event of an outage, failure, or other issue associated with the captcha challenge.

In a fourth evaluation stage, analysis apparatus 204 may apply one or more sets of overrides (e.g., overrides 1 232, overrides n 234) to modifications 248-250. The overrides may represent "sanity checks" and/or other stable rules that enforce a set of results after the static decisions and dynamic rules have been applied in earlier stages of the processing flow. For example, the overrides may be used to remove a security challenge (e.g., when the corresponding user action has an IP address and/or other attributes that belong to a trusted user) and/or test a different type of security challenge (e.g., to verify that the challenge can be solved by non-malicious users when no security challenge has been selected for the users in previous evaluation stages). The overrides may also, or instead, be used to apply an exception to the dynamic rules (e.g., undoing a response that is known to not work in certain locations) and/or enforce a policy associated with access to the service (e.g., enforcing legal requirements for two-factor authentication even when one of the factors cannot be provided due to an outage). The overrides may further be used to whitelist test accounts and/or other types of user accounts as excepted from security challenges and/or other types of responses. As with the static decisions and dynamic rules, the overrides may be specified using conditional statements, and one or more sets of overrides may be matched to a given user action based on configuration 214 and/or attributes 240-242 of the user action.

After analysis apparatus 204 has generated a response and/or one or more modifications to the response for a user action using all four stages of the processing flow, management apparatus 206 may generate output 208 for performing the response. For example, management apparatus 206 may accept the user action (e.g., by processing a purchase, creating an account, authenticating a user, transmitting a message, etc.), block the user action (e.g., by rejecting a purchase, account creation request, and/or authentication request), delay the user action, redirect the user action (e.g., to a different page or screen than the one requested in the user action), and/or present a challenge (e.g., captcha challenge, two-factor authentication challenge, etc.) specified in the response.

Management apparatus 206 may also monitor and/or aggregate outcomes 210 associated with responses 244-246, modifications 248-250, and/or output 208. For example, management apparatus 206 may track the rates at which each type of challenge is shown, submitted, or solved for a given type of user action and/or location. In another example, management apparatus 206 may monitor, for a given type of user action or response, the rate at which malicious activity is carried out or reported. In a third example, management apparatus 206 may determine, for each individual user action, an outcome that specifies if the user action resulted in malicious activity or non-malicious activity. Management apparatus 206 may update data repository 134 and/or another data store with individual or aggregated outcomes 210 and/or emit events containing outcomes 210 for subsequent processing and use by other components of the system. In turn, the updates may be used to update rate limit thresholds associated with subsequent user actions.

In particular, analysis apparatus 204, management apparatus 206, and/or another component of the system may use outcomes 210 and multiple versions (e.g., versions 120 of FIG. 1) of the statistical models, static decisions, dynamic rules, and/or overrides to make and/or evaluate changes to the processing flow. The versions may include a current version for each statistical model, set of static decisions, set of dynamic rules, and/or set of overrides. The current version used in each stage of the processing flow may be obtained from configuration 214, matched to attributes 240-242 of a user action, and applied to input data associated with the user action to advance the processing flow to the next stage. In turn, statistical model output, responses 244-246 and modifications 248-250 produced by the current versions of dynamic rules and overrides in the processing flow may be used to produce output 208 for managing potential malicious activity in the user action.

The versions may also include one or more proposed versions of a given statistical model, set of static decisions, set of dynamic rules, and/or set of overrides. Each proposed version may represent a newer version of a model or set of rules. The component may evaluate the performance of the proposed versions by producing one or more "proposed" processing flows with the proposed versions substituted for the current versions. For example, the component may assess the performance of a proposed version for executing a given stage by creating a proposed processing workflow in which the proposed version is substituted for the current version and all other stages are executed using the current versions. Alternatively, the component may generate multiple proposed processing flows using different numbers and combinations of proposed and/or current versions of the stages. The component may further vary the proposed processing flows with multiple proposed versions of a given stage, if multiple proposed versions exist. The component may then execute each proposed processing flow with some or all user actions monitored by analysis apparatus 204 to obtain a different set of statistical model output, responses, and/or modifications to the responses from those of the "current" processing flow used by the system to generate output 208.

The component may perform analysis related to multiple versions of the statistical models, static decisions, dynamic rules, and/or overrides in multiple ways. For example, the component may use an offline-processing system to analyze multiple versions of each stage of the processing flow. The analysis may be used to compare data and/or outcomes 210 associated with each stage, generate additional training data for the statistical models, and/or perform other types of comparison or modifications associated with the processing flow. In another example, the component may use a nearline-processing system to search for and/or retrieve events related to monitored user actions and/or outcomes 210. The component may also use the events to perform subsequent near-real-time analysis related to applying multiple versions of the processing flow to the user actions and/or assessing outcomes associated with the versions.

However, instead of producing output 208 that applies responses from the proposed processing flows to the user actions, the component may compare outcomes 210 from the current processing flow to hypothetical outcomes associated with the proposed processing flows without deploying the proposed processing flows in real-world scenarios. For example, the component may obtain outcomes 210 as a set of true positive, true negative, false positive, false negative, and/or incidence rates associated with the statistical model output, responses 244-246, modifications 248-250, and/or output 208 from the current processing flow. The component may also determine hypothetical outcomes of the proposed processing flows by calculating the same rates using the corresponding sets of model output and/or responses. In another example, the component may compare the speeds at which the current and proposed processing flows execute, with the aim of reducing latency in responding to security incidents.

When a proposed processing flow is identified as having better performance than a current processing flow and/or other proposed processing flows, the component may ramp up use of the proposed processing flow in managing subsequent user actions received by the service. For example, the component may use responses from the proposed processing flow to generate output 208 for managing increasingly large proportions of user actions, as long as the proposed processing flow continues to perform better than the current processing flow. In another example, the component may ramp up use of proposed versions of different stages in the processing workflow at different rates. In a third example, the component may perform ramping up of multiple proposed processing workflows at the same time. Consequently, the system of FIG. 2 may perform incident response in a manner that is automatic, prompt, and adaptive while reducing negative or unintended effects of responses 244-246.

Those skilled in the art will appreciate that the system of FIG. 2 may be implemented in a variety of ways. First, analysis apparatus 204, management apparatus 206, and/or data repository 134 may be provided by a single physical machine, multiple computer systems, one or more virtual machines, a grid, one or more databases, one or more filesystems, and/or a cloud computing system. Analysis apparatus 204 and management apparatus 206 may additionally be implemented together and/or separately by one or more hardware and/or software components and/or layers.

Second, different techniques may be used to implement and/or provide configuration 214, statistical models, static decisions, dynamic rules, and/or overrides. For example, the statistical models may be implemented using artificial neural networks, Bayesian networks, support vector machines, clustering techniques, regression models, random forests, and/or other types or combinations of machine learning techniques. Similarly, configuration 214, static decisions, dynamic rules, and/or overrides may be specified using key-value pairs, JavaScript Object Notation (JSON) objects, Extensible Markup Language (XML) documents, property lists, database records, and/or other types of structured data.

Figure 3:
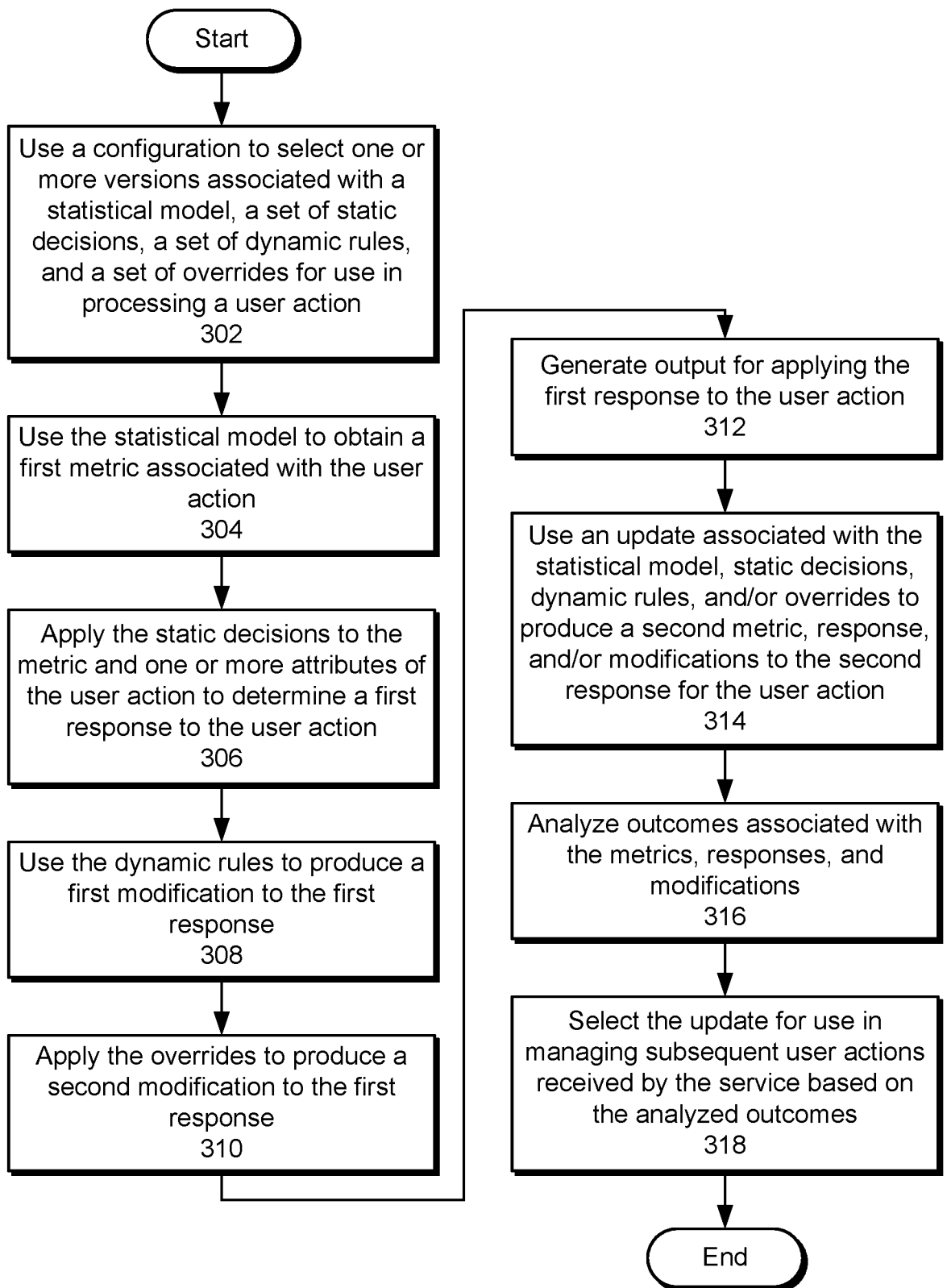
FIG. 3 shows a flowchart illustrating the processing of user actions with a service in accordance with the disclosed embodiments.

FIG. 3 shows a flowchart illustrating the processing of user actions with a service in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, a configuration is used to select one or more versions associated with a statistical model, a set of static decisions, a set of dynamic rules, and a set of overrides for use in processing a user action (operation 302). For example, the configuration may specify a set of attributes associated with each statistical model, set of static decisions, set of dynamic rules, and/or set of overrides. The configuration may thus be used to match attributes associated with the user action to the corresponding statistical model, set of static decisions, set of dynamic rules, and/or set of overrides. The attributes may include a type of user action, a location, and/or a type of malicious activity. The type of user action may include, but is not limited to, a page view, comment, like, job activity, advertisement activity, account registration, account management activity (e.g., merging multiple accounts, changing between regular and premium accounts, etc.), login attempt, address book upload, connection request, message, post, purchase, and/or password reset. The location may be based on an IP address of the user action. The type of malicious activity may include spamming, phishing, fake account creation, account takeover, scraping, and/or other types of security incidents.

The statistical model, static decisions, dynamic rules, and overrides may be used over multiple stages of a processing flow for the user action. In the first stage of the processing flow, the statistical model is used to obtain a first metric associated with the user action (operation 304). For example, the statistical model may be applied to attributes and/or features associated with the user action to generate a score representing the likelihood that the user action represents malicious activity.

In a second stage of the processing flow, the static decisions are applied to the metric and one or more attributes of the user action to determine a first response to the user action (operation 306). For example, conditional statements in the static decisions may be matched to the metric and/or attributes. When the metric and/or attributes match a condition in the static decisions, the corresponding result is included in the first response. The first response may include accepting the user action, blocking the user action, delaying the user action, flagging the user action for manual (e.g., human) review, redirecting the user action, and/or presenting a challenge related to the user action.

In a third stage of the processing flow, the dynamic rules are used to produce a first modification to the first response (operation 308). For example, the first modification may specify presenting a different challenge in response to the user action and/or generating a more severe response to the user action. Because the dynamic rules can be updated in near-real-time, the dynamic rules may facilitate prompt adaptation to and handling of outages, severe incidents, and/or other urgent issues.

In a fourth and final stage of the processing flow, the overrides are applied to produce a second modification to the first response (operation 310). The overrides may be stable rules that enforce a set of results after the static decisions and dynamic rules have been applied to the user action. For example, the overrides may be used to remove or omit the first response, test a second response in lieu of or in addition to the first response, apply an exception to the dynamic rules, and/or enforce a policy associated with access to the service.

After the processing flow is complete, output for applying the first response to the user action is generated (operation 312). For example, the output may include presenting a challenge that has to be solved before the user action is carried out, redirecting to a different page or screen than the one requested with the user action, blocking the user action, and/or requiring additional user input or activity that delays the user action and/or mitigates the potential negative effect of the user action.

An update associated with the statistical model, static decisions, dynamic rules, and/or overrides is also used to produce a second metric, response, and/or modifications to the second response for the user action (operation 314). The update may include proposed and/or newer versions of one or more stages of the processing workflow. Because the update is configured differently from the current versions used to execute the processing workflow in operations 304-310, the update may produce different values of statistical model output, and/or response than the current versions.

Outcomes associated with both versions of metrics, responses, and modifications are then analyzed (operation 316). For example, true and false positive rates, true and false negative rates, incidence rates, and/or other performance metrics may be calculated for the current and proposed processing workflows. Finally, the update is selected for use in managing subsequent user actions received by the service based on the analyzed outcomes (operation 318). Continuing with the previous example, use of the update in managing the subsequent user actions may be ramped up when the performance metrics indicate a better outcome for the update. In turn, operations 302-312 may be performed using the update for an increasingly large subset of the subsequent user actions, as long as the performance of the update is better than the performance of the current version and/or the update does not result in increased latency or other issues.

Figure 4:
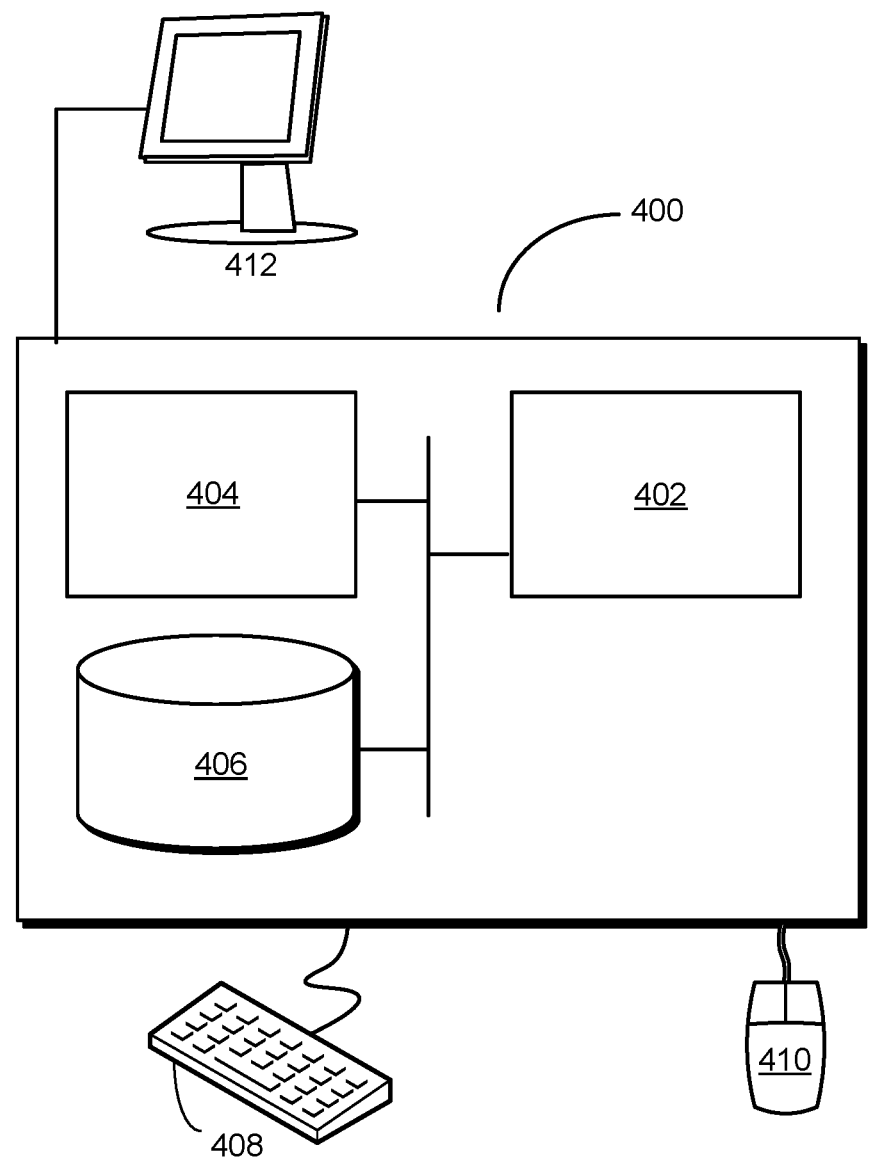
FIG. 4 shows a computer system in accordance with the disclosed embodiments.

FIG. 4 shows a computer system 400 in accordance with the disclosed embodiments. Computer system 400 includes a processor 402, memory 404, storage 406, and/or other components found in electronic computing devices. Processor 402 may support parallel processing and/or multi-threaded operation with other processors in computer system 400. Computer system 400 may also include input/output (I/O) devices such as a keyboard 408, a mouse 410, and a display 412. Computer system 400 may also, or instead, include components of a portable electronic device, such as a touchscreen, camera, fingerprint sensor, and/or one or more inertial sensors.

Computer system 400 may include functionality to execute various components of the present embodiments. In particular, computer system 400 may include an operating system (not shown) that coordinates the use of hardware and software resources on computer system 400, as well as one or more applications that perform specialized tasks for the user. To perform tasks for the user, applications may obtain the use of hardware resources on computer system 400 from the operating system, as well as interact with the user through a hardware and/or software framework provided by the operating system.

In one or more embodiments, computer system 400 provides a system for processing user actions with a service. The system may include an analysis apparatus and a management apparatus, one or both of which may alternatively be termed or implemented as a module, mechanism, or other type of system component. The analysis apparatus may use a statistical model to obtain a first metric associated with a user action received by a service. Next, the analysis apparatus may apply a set of static decisions to the metric and one or more attributes of the user action to determine a first response to the user action. The analysis apparatus may then use a set of dynamic rules to produce a first modification to the first response and apply a set of overrides to produce a second modification to the first response. Finally, the management apparatus may generate output for applying the first response to the user action.

In addition, one or more components of computer system 400 may be remotely located and connected to the other components over a network. Portions of the present embodiments (e.g., analysis apparatus, management apparatus, data repository, online professional network, service, etc.) may also be located on different nodes of a distributed system that implements the embodiments. For example, the present embodiments may be implemented using a cloud computing system that executes multiple escalation-compatible processing workflows for managing user actions from a set of remote users.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
    using a statistical model to obtain a first metric associated with a user action received by a service;
    applying, by one or more computer systems, a set of static decisions to the metric and one or more attributes of the user action to determine a first response to the user action, wherein the first response is associated with a first severity level;
    using a set of dynamic rules to produce, by the one or more computer systems, a first modification to the first response, wherein the first modification to the first response includes a dynamic modification to the first severity level; and
    generating output for applying the first response to the user action.

2. The method of claim 1, further comprising:
    applying a set of overrides to produce a second modification to the first response prior to applying the first response to the user action.

3. The method of claim 2, further comprising:
    using a configuration to select one or more versions associated with the statistical model, the static decisions, the dynamic rules, and the overrides for use in processing the user action.

4. The method of claim 3, further comprising:
    using an update associated with the statistical model, static decisions, dynamic rules, or overrides to produce a second metric, a second response, and one or more modifications to the second response;
    analyzing outcomes associated with the first metric, first response, second metric, and second response; and
    selecting the update for use in managing subsequent user actions received by the service based on the analyzed outcomes.

5. The method of claim 4, wherein selecting the update for use in managing the subsequent user actions based on the analyzed outcomes comprises:
    when a higher performance is associated with the update, the second response, and the one or more modifications, ramping up use of the update in managing the subsequent user actions.

6. The method of claim 2, wherein the overrides comprise at least one of:
    removing the first response;
    testing a second response;
    applying an exception to the dynamic rules; and
    enforcing a policy associated with access to the service.

7. The method of claim 1, further comprising:
    matching the statistical model to the one or more attributes of the user action prior to obtaining the metric.

8. The method of claim 1, wherein the one or more attributes comprise at least one of:
    a time of the user action;
    a type of the user action;
    a location; and
    a type of malicious activity.

9. The method of claim 8, wherein the type of the user action comprises at least one of:
    a page view;
    a comment;
    a like activity;
    job activity;
    advertisement activity;
    account management activity;
    an account registration;
    a login attempt;
    an address book upload;
    a connection request;
    a message;
    a post;
    a purchase; and
    a password reset.

10. The method of claim 1, wherein the first response comprises at least one of:
  accepting the user action;
  blocking the user action;
  delaying the user action;
  flagging the user action for manual review;
  redirecting the user action; or
  presenting a challenge related to the user action.

11. The method of claim 1, wherein the first metric comprises a score representing a likelihood of malicious activity in the user action.

12. An apparatus, comprising:
  one or more processors; and
  memory storing instructions that, when executed by the one or more processors, cause the apparatus to:
    use a statistical model to obtain a first metric associated with a user action received by a service;
    apply a set of static decisions to the metric and one or more attributes of the user action to determine a first response to the user action wherein the first response is associated with a first severity level;
    use a set of dynamic rules to produce a first modification to the first response, wherein the first modification to the first response includes a dynamic modification to the first severity level; and
    generate output for applying the first response to the user action.

13. The apparatus of claim 12, wherein the memory further stores instructions that, when executed by the one or more processors, cause the apparatus to:
  apply a set of overrides to produce a second modification to the first response prior to applying the first response to the user action.

14. The apparatus of claim 13, wherein the memory further stores instructions that, when executed by the one or more processors, cause the apparatus to:
  use a configuration to select one or more versions associated with the statistical model, the static decisions, the dynamic rules, and the overrides for use in processing the user action.

15. The apparatus of claim 14, wherein the memory further stores instructions that, when executed by the one or more processors, cause the apparatus to:
  use an update associated with the statistical model, static decisions, dynamic rules, or overrides to produce a second metric, a second response, and one or more modifications to the second response;
  analyze outcomes associated with the first metric, first response, second metric, and second response; and
  select the update for use in managing subsequent user actions received by the service based on the analyzed outcomes.

16. The apparatus of claim 15, wherein selecting the update for use in managing the subsequent user actions based on the analyzed outcomes comprises:
  when a higher performance is associated with the update, the second response, and the one or more modifications, ramping up use of the update in managing the subsequent user actions.

17. The apparatus of claim 13, wherein the overrides comprise at least one of:
  removing the first response;
  testing a second response;
  applying an exception to the dynamic rules; and
  enforcing a policy associated with access to the service.

18. The apparatus of claim 12, wherein the first response comprises at least one of:
  accepting the user action;
  blocking the user action;
  delaying the user action;
  flagging the user action for manual review;
  redirecting the user action; or
  presenting a challenge related to the user action.

19. A system, comprising:
  one or more processors;
  an analysis module comprising a non-transitory computer-readable medium storing instructions that, when executed by the one or more processors, cause the system to:
    use a statistical model to obtain a first metric associated with a user action received by a service;
    apply a set of static decisions to the metric and one or more attributes of the user action to determine a first response to the user action wherein the first response is associated with a first severity level;
    use a set of dynamic rules to produce a first modification to the first response, wherein the first modification to the first response includes a dynamic modification to the first severity level; and
    apply a set of overrides to produce a second modification to the first response; and
  a management module comprising a non-transitory computer-readable medium storing instructions that, when executed, cause the system to generate output for applying the first response to the user action.

20. The system of claim 19, wherein the non-transitory computer-readable medium of the analysis module further stores instructions that, when executed, cause the system to:
  use an update associated with the statistical model, static decisions, dynamic rules, or overrides to produce a second metric, a second response, and one or more modifications to the second response;
  analyze outcomes associated with the first metric, first response, second metric, and second response; and
  select the update for use in managing subsequent user actions received by the service based on the analyzed outcomes.

* * * * *